United States Patent
Peng

(10) Patent No.: US 7,864,434 B2
(45) Date of Patent: Jan. 4, 2011

(54) SOLID IMMERSION FOCUSING APPARATUS FOR HIGH-DENSITY HEAT ASSISTED RECORDING

(75) Inventor: Chubing Peng, Sewickley, PA (US)

(73) Assignee: Seagate Technology LLC, Scotts Valley, CA (US)

( * ) Notice: Subject to any disclaimer, the term of this patent is extended or adjusted under 35 U.S.C. 154(b) by 350 days.

(21) Appl. No.: 12/193,965

(22) Filed: Aug. 19, 2008

(65) Prior Publication Data
US 2010/0046083 A1 Feb. 25, 2010

(51) Int. Cl.
*G02B 3/00* (2006.01)
(52) U.S. Cl. .................. 359/642; 359/652; 359/796
(58) Field of Classification Search ............ 359/642, 359/652–655, 741–743, 796
See application file for complete search history.

(56) References Cited

U.S. PATENT DOCUMENTS

| | | | |
|---|---|---|---|
| 6,795,630 B2 | 9/2004 | Challener et al. | 385/129 |
| 6,944,101 B2 | 9/2005 | Johns et al. | 369/13.13 |
| 6,944,112 B2 | 9/2005 | Challener | 369/112.27 |
| 6,980,374 B1 | 12/2005 | Schlesinger | 359/726 |
| 7,106,935 B2 | 9/2006 | Challener | 385/129 |
| 7,171,080 B2 | 1/2007 | Rausch | 385/37 |
| 7,272,079 B2 | 9/2007 | Challener | 369/13.17 |
| 7,330,404 B2 | 2/2008 | Peng et al. | 369/13.33 |
| 7,352,941 B2 | 4/2008 | Bratkovski et al. | 385/129 |
| 2003/0137772 A1 | 7/2003 | Challener | 360/131 |
| 2005/0041950 A1 | 2/2005 | Rottmayer et al. | 385/147 |
| 2005/0078565 A1 | 4/2005 | Peng et al. | 369/13.32 |
| 2005/0289576 A1 | 12/2005 | Challener | 720/658 |
| 2006/0182393 A1 | 8/2006 | Sendur et al. | 385/39 |

OTHER PUBLICATIONS

Liu and He; L. & S.; "Near-Field Optical Storage System Using a Solid Immersion Lens with a Left-Handed Material Slab," *Optics Express*, v. 4, No. 20, Oct. 4, 2004.
Challener et al., W.; "Miniature Planar Solid Immersion Mirror with Focused Spot Less than a Quarter Wavelength," *Optics Express*, v. 13, No. 18, Sep. 5, 2005, 9 pgs.

*Primary Examiner*—Darryl J Collins
(74) *Attorney, Agent, or Firm*—Theodore M. Magee; Westman, Champlin & Kelly, P.A.

(57) ABSTRACT

In a particular embodiment, a solid immersion lens includes meta-material slabs formed from multiple layers of at least two different compositions. Each meta-material slab has a first effective index of refraction. The meta-material slabs are adapted to propagate an evanescent wave in a direction parallel to an axis to form a cone-shaped wave along the axis. The solid immersion lens further includes a core sandwiched between the meta-material slabs along the axis and having a second index of refraction that is less than the first effective index of refraction. The core directs surface plasmons that are excited by the cone-shaped wave to a focused area coincident with the axis.

21 Claims, 14 Drawing Sheets

US 7,864,434 B2

SOLID IMMERSION FOCUSING APPARATUS FOR HIGH-DENSITY HEAT ASSISTED RECORDING

FIELD OF THE INVENTION

The present disclosure generally relates to a solid immersion focusing apparatus for high-density heat assisted recording.

BACKGROUND OF THE INVENTION

In thermally assisted magnetic/optical recording, information bits are recorded to a storage layer of a storage media at elevated temperatures. Generally, a spot or area on the storage medium is heated to reduce its coercivity sufficiently so that an applied magnetic field or optical write signal can record data to the storage medium.

One particular technique for heating the spot or area includes focusing energy at a surface of the storage medium using an optical antenna or aperture, sometimes referred to as a near-field optical transducer (NFT), to achieve a tiny confined optical spot beyond a diffraction limit of an optical lens. An optical antenna relies on excitation of local surface plasmon (LSP) at an interface between a metal of free electrons and a dielectric material. The NFT is designed to have a size that excites the LSP at a desired light wavelength ($\lambda$). At the interface between the dielectric material and the metal, collective oscillations of electrons in the metal increase interaction between electrons in the metal and the light wave and induce a high electrical field to develop around the metal. A portion of the field can tunnel into an adjacent storage medium, which absorbs associated energy, raising the temperature of the adjacent storage medium locally. The increased temperature can be used for heat-assisted recording.

Unfortunately, the optical antenna can dissipate energy. Further, the heat-assisted recording device can be sensitive to head-media space (HMS) and to fabrication variances in the shape of antenna. Embodiments disclosed herein can provide solutions to these and other problems, and offer other advantages over the prior art.

SUMMARY OF THE INVENTION

In a particular embodiment, a solid immersion lens includes meta-material slabs formed from multiple layers of at least two different compositions. Each meta-material slab has a first effective index of refraction. The meta-material slabs are adapted to propagate an evanescent wave in a direction parallel to an axis to form a cone-shaped wave along the axis. The solid immersion lens further includes a core sandwiched between the meta-material slabs along the axis and having a second index of refraction that is less than the first effective index of refraction. The core directs surface plasmons that are excited by the cone-shaped wave to a focused area coincident with the axis.

In another particular embodiment, a recording head is disclosed that includes a solid immersion lens. The solid immersion lens includes at least two meta-material slabs having first effective permittivities. Each of the at least two meta-material slabs has multiple layers of at least two materials having different relative permittivities. The solid immersion lens further includes a core sandwiched between the at least two meta-material slabs and having a second permittivity that is less than the first effective permittivities.

In still another particular embodiment, a solid immersion lens includes at least two meta-material slabs having alternating layers of at least two different materials with different thicknesses and different relative permittivities. The at least two meta-material slabs having first effective permittivities. The solid immersion lens further includes a core sandwiched between the at least two meta-material slabs and having a second permittivity that is less than the first effective permittivities.

DETAILED DESCRIPTION OF ILLUSTRATIVE EMBODIMENTS

Figure 1:
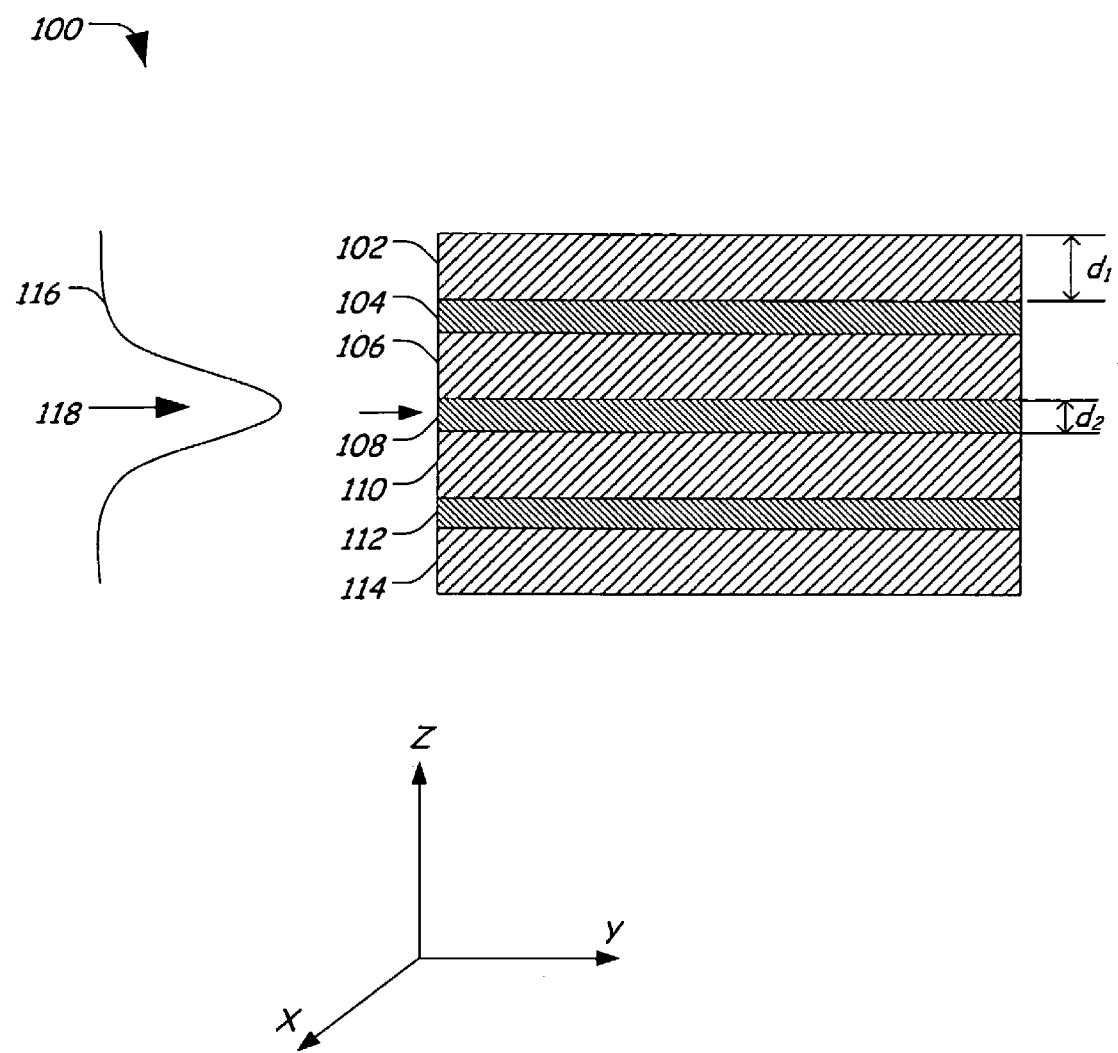
FIG. 1 is a block diagram of a particular illustrative embodiment of a meta-material slab including multiple layers.

FIG. 1 is a block diagram of a particular illustrative embodiment of a meta-material slab 100 including multiple layers. The meta-material slab 100 includes a first layer 102, a second layer 104, a third layer 106, a fourth layer 108, a fifth layer 110, and sixth layer 112, and a seventh layer 114 stacked in a Z-direction. In a particular embodiment, the meta-material slab 100 is a periodically layered by alternating materials. For example, the first, third, fifth, and seventh layers 102, 106, 110, and 114 may be formed from a first material having a first permittivity ($\in_1$) and a first thickness ($d_1$) and the second, fourth, and sixth layers 104, 108, and 112 may be formed from a second material having a second permittivity ($\in_2$) and a second thickness ($d_2$). In a particular example, the first and second materials may have different material compositions, different thicknesses, different permittivities, different indexes of refraction, different relative dielectric constants, or any combination thereof.

In a particular embodiment, if the thicknesses ($d_1$, and $d_2$) of the layers 102, 104, 106, 108, 110, 112, and 114 is much less than the wavelength ($\lambda$) of light incident on the meta-material slab 100, the meta-material slab 100 can be considered to be an effective anisotropy meta-material. In general, since the meta-material slab 100 has a different composition in different directions, the permittivity tensor includes X, Y, and Z components. Thus, the effective anisotropy meta-material has a permittivity tensor ($\in$) given by a vector defined by the following matrix:

$$\varepsilon = \begin{pmatrix} \varepsilon_x & 0 & 0 \\ 0 & \varepsilon_y & 0 \\ 0 & 0 & \varepsilon_z \end{pmatrix}. \quad \text{(Equation 1)}$$

In equation 1, the permittivity tensors in the X-direction and the Y-direction are determined by the following equation:

$$\in_x = \in_y = (c_1\in_1 + c_2\in_2). \quad \text{(Equation 2)}$$

Further, the permittivity tensor in the Z-direction is determined by the following equation:

$$\varepsilon_z = \frac{\varepsilon_1 \cdot \varepsilon_2}{(c_2\varepsilon_1 + c_1\varepsilon_2)} \quad \text{(Equation 3)}$$

The coefficients ($c_1$, and $c_2$) are determined according to the following equations:

$$c_1 = \frac{d_1}{(d_1 + d_2)}; \quad \text{(Equation 4)}$$

and $$c_2 = \frac{d_2}{(d_1 + d_2)}. \quad \text{(Equation 5)}$$

In equations 4 and 5, the variables ($d_1$) and ($d_2$) represent the relative thicknesses of the material layers of the meta-material slab 100.

In general, a dispersion relation for the incident waves is can be determined from the following equation:

$$\frac{k_x^2 + k_y^2}{\varepsilon_z} + \frac{k_z^2}{\varepsilon_x} = \left(\frac{\omega}{c}\right)^2. \quad \text{(Equation 6)}$$

In equation 6, the variable ($\omega$) represents an angular frequency of the incident light, the variable (c) represents the speed of light in free space, and the variables $k_x$, $k_y$, and $k_z$, represent the x-, y-, and z-component of the wavevector of the light propagating in the meta-material slab 100. In general, it should be understood that the multiple layers of the meta-material slab 100 introduce an effective dielectric constant that is directional in that an effective dielectric constant ($\in_z$) in a Z-direction is different from the effective dielectric constants ($\in_x$ and $\in_y$) in the X-direction and the Y-direction, respectively.

In a particular embodiment, one of materials of the meta-material slab 100 is a noble metal, such as aluminum, gold, silver, or copper, having a permittivity tensor ($\in<0$), which is below a plasmon frequency associated with a metal adjacent to the meta-material slab 100. In this particular embodiment, the other material is a dielectric material, having a permittivity tensor ($\in_2>0$), then an effective permittivity in the X-direction, the Y-direction and the Z-direction may have opposite signs. In a particular embodiment, the first, third, fifth, and seventh layers 102, 106, 110, and 114 are formed from a noble metal and have a permittivity tensor ($\in_1<0$). The second, fourth, and sixth layers 104, 108, and 112 are formed from dielectric material and have a permittivity tensor ($\in_2>0$). In this particular example, light is incident on the meta-material slab 100 along the Z-axis. The periodic structure induces evanescent waves at the interface of the meta-material slab. Such evanescent waves, such as the wave 116 having a large wave vector in the X-direction and the Z-direction ($k_x$, $k_z$), can propagate through the meta-material slab 100 with a real value in a Y-direction ($k_y$). The Y-component of the wave vector is generally indicated at 118. In this particular example, the real Y-component of the wave vector propagates along the Y-axis and induces a high cone-shaped electrical field to form along the y axis with a half-angle determined by the following equation:

$$\phi = \tan-1\left(\sqrt{-\frac{\varepsilon_z}{\varepsilon_x}}\right) \quad \text{(Equation 7)}$$

In a particular embodiment, by sandwiching a conductor or core between two such meta-material slabs 100, the induced cone-shape electrical field can excite local surface plasmon (LSP) at the interface between the meta-material slabs and the core, and the core can direct the energy from the excitation toward a surface, such as a recording medium.

In general, while the following discussion is largely directed to data recording applications, it should be understood that the meta-material slab 100 can be used in connection with a core to direct energy toward a focused area on a work piece. Such work pieces can include any sort of material that requires a concentrated optical energy source for, instance, localized heating. In a particular example, the meta-material slab and the associated core may be used to locally heat tissue adjacent to a medical device.

Figure 2:
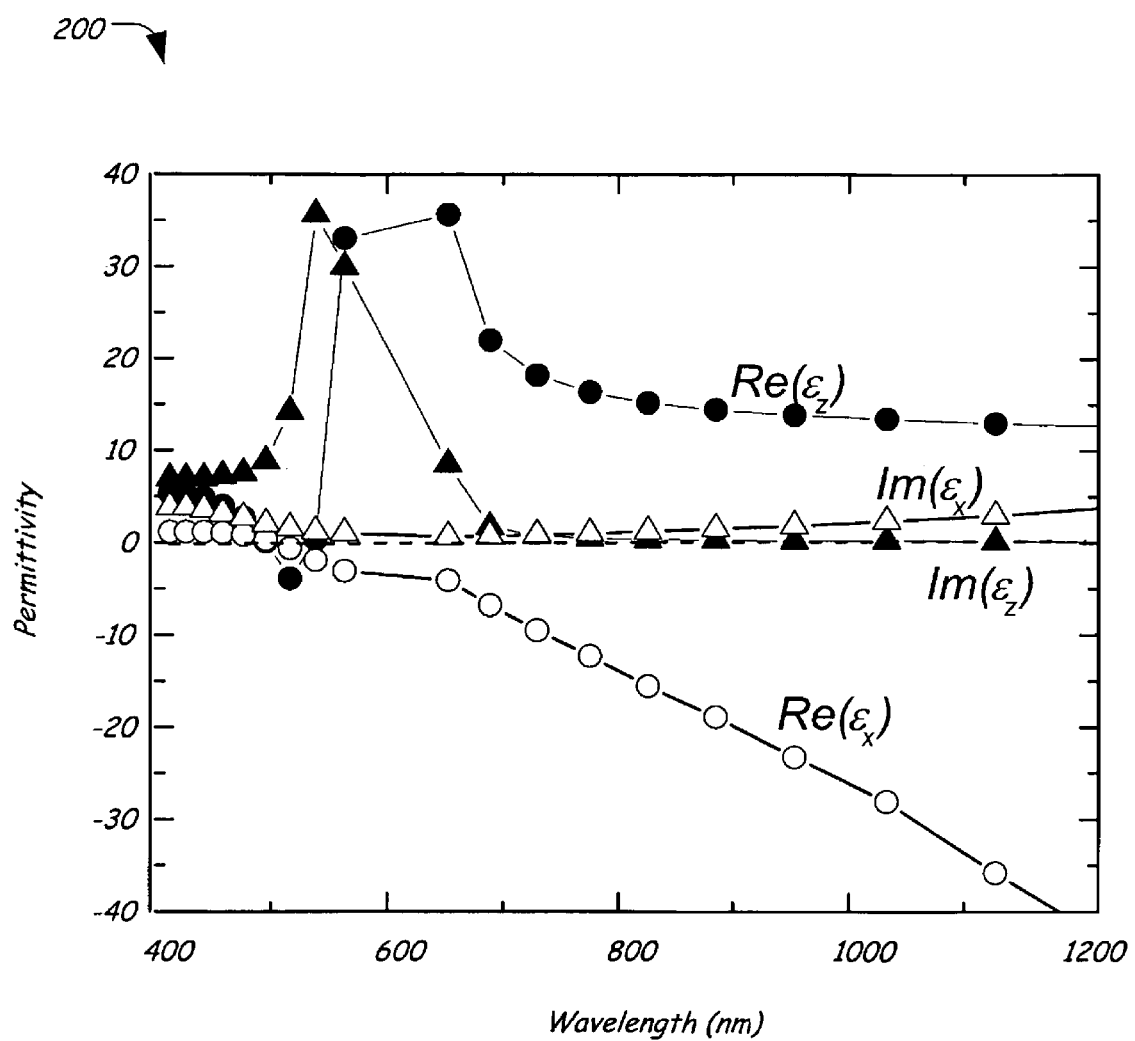
FIG. 2 is a graph of a particular illustrative embodiment of permittivity versus wavelength of imaginary and real components of a waveform incident to a meta-material slab, such as the meta-material slab illustrated in FIG. 1, constructed from 15-nm thick layers of gold and 10-nm thick layers of tantala having a dielectric constant of 2.15.

FIG. 2 is a graph 200 of a particular illustrative embodiment of the real and imaginary part of effective permittivity of a meta-material slab versus light wavelength, such as the meta-material slab 100 illustrated in FIG. 1, composed of alternating layers of 15-nm of gold and 10-nm of tantala as a function of free space wavelength ($\lambda$). As the free space wavelength ($\lambda$) increases to a wavelength that is greater than 700-nm, the imaginary part of the permittivity become very small. In a particular example of a free space wavelength ($\lambda$=830-nm), for incident waves that are polarized in a z-direction, the effective refractive index (n) can be determined from the following equation:

$$n=\sqrt{\in_z}=3.893+j0.0042 \quad \text{(Equation 8)}$$

Generally, the imaginary component represents loss, which becomes very low at higher wavelengths. Referring to FIG. 2, a real part of the permittivity tensor ($\in_z$) in the Z-direction has a peak permittivity at wavelengths of approximately 650-nm and decreases on either side. A real component of the permittivity tensor ($\in_x$) in the X-direction becomes increasingly negative at longer wavelengths. However, the imaginary part (Im($\in_x$ and $\in_z$)) in the X-direction and the Z-direction remain approximately zero, which indicates that the meta-material slab exhibits low energy dissipation.

Figure 3:
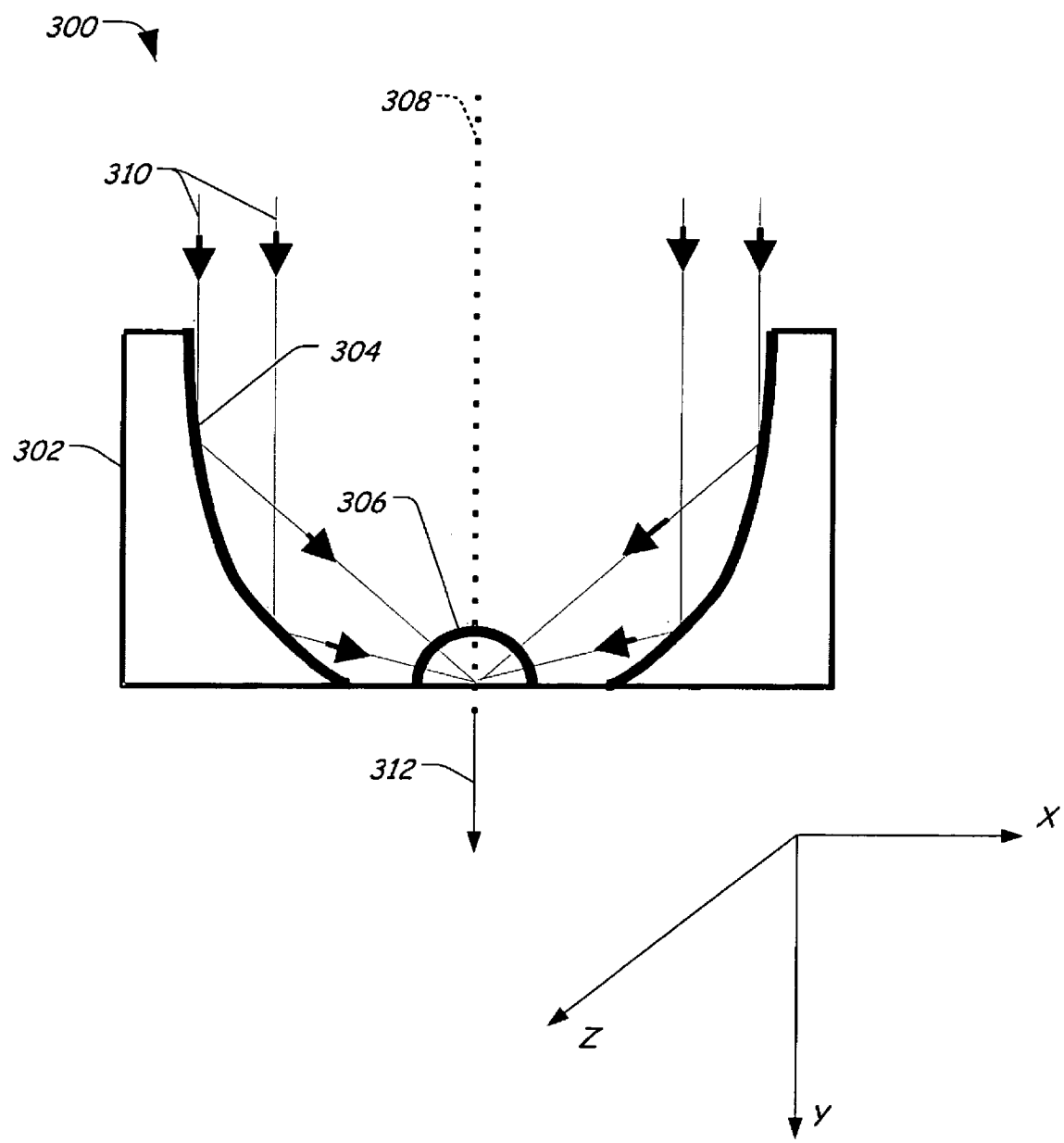
FIG. 3 is a cross-sectional diagram of a particular illustrative embodiment of a waveguide including a solid immersion lens formed from a core having a low index of refraction for low light propagation loss sandwiched between meta-material slabs, such as the meta-material slab illustrated in FIG. 1.

FIG. 3 is a cross-sectional diagram of a particular illustrative embodiment of a waveguide 300 including a solid immersion lens 306 formed from a core having a low index of refraction for low light propagation loss sandwiched between meta-material slabs, such as the meta-material slab 100 illustrated in FIG. 1. In general, the waveguide 300 includes a solid immersion mirror 302 that is adapted to focus and condense light. The solid immersion mirror is fabricated on the planar waveguide 300, which is composed of a core layer sandwiched between cladding layers. The solid immersion mirror 302 includes a parabolic sidewall portion 304 that is adapted to reflect and direct light, such as light rays 310, toward an optical axis 308 where the solid immersion lens 306 is located. In the direction normal to the waveguide plane (i.e., in the Y-direction), light rays 310 are confined by a fundamental waveguide mode with a magnetic field parallel to the waveguide plane (the transverse magnetic (TM) mode).

The solid immersion lens 306 includes two meta-material slabs, such as the meta-material slab 100 illustrated in FIG. 1, separated by a core. In a particular embodiment, the core is formed from a material having a low index of refraction relative to the meta-material slabs for low light propagation loss. At least one of the meta-material slabs may be shaped to form a hemi-cylindrically shaped solid immersion lens 306 to achieve a confined spot in the Y-direction. The hemi-cylindrically shaped solid immersion lens 306 directs energy (generally indicated at 312) toward a surface, such as a surface of a recording medium. In general, the energy is directed along or coincident with the axis 308.

In a particular embodiment, the solid immersion lens 306 includes meta-material slabs having multiple layers, which operate to compress energy from excitation of plasmons to a focused spot without loss of fineness. In general, the particular construction of the solid immersion lens 306 is less sensitivity to fabrication variances, in part, because materials of high index of refraction can be synthesized by controlling geometric factors in the meta-material layers (such as thickness).

Figure 4:
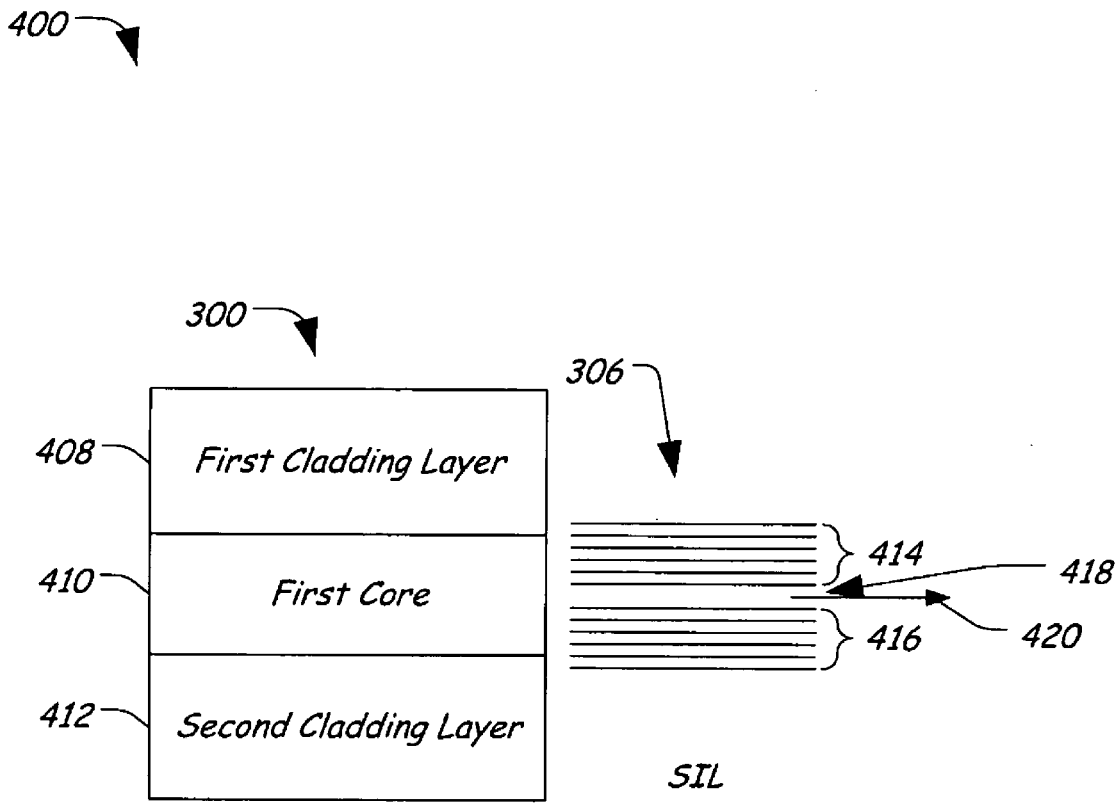
FIG. 4 is a block diagram of a particular illustrative embodiment of a portion of the wave guide of FIG. 3, illustrating an interface between the waveguide and the solid immersion lens.

FIG. 4 is a block diagram of a particular illustrative embodiment of a portion 400 of the waveguide 300 of FIG. 3, illustrating an interface between the waveguide 300 and the meta-material solid immersion lens 306. In a particular example, the portion of the waveguide 300 may be shaped to form the solid immersion mirror 302 illustrated in FIG. 3 at the interface. As shown, the portion of the waveguide 300 includes a first core layer 410 sandwiched between first and second cladding layers 408 and 412. The solid immersion lens 306 includes a second core layer 418 that is sandwiched between meta-material slabs 414 and 416. In a particular embodiment, the meta-material slabs 414 and 416 can be formed from a metal film with a periodic arrangement of cut-through slits. In this instance, the meta-material slabs 414 and 416 have a frequency-dependent effective refractive index, which is determined by the ratio between the width of the metal and that of the slit.

Alternatively, the meta-material slabs 414 and 416 are formed from multiple periodic layers of different materials having different material compositions, different thicknesses, different permittivities, different indexes of refraction, different relative dielectric constants, or any combination thereof. The meta-material slabs 414 and 416 are designed to allow a portion of an incident wave form to propagate along the Y-axis, forming a cone around the y-axis and along the second core 418, resulting in focused energy 420 being directed coincident with the Y-axis of the second core 418.

In a particular embodiment, either by controlling a geometry of cut-through slits or by controlling geometries of the multiple layers of the meta-material slabs 414 and 416, the energy from excitation of plasmons at the interface between the second core 418 and the meta-material slabs 414 and 416 can be compressed and focused without loss of fineness and with reduced sensitivity to manufacturing variations.

Figure 5:
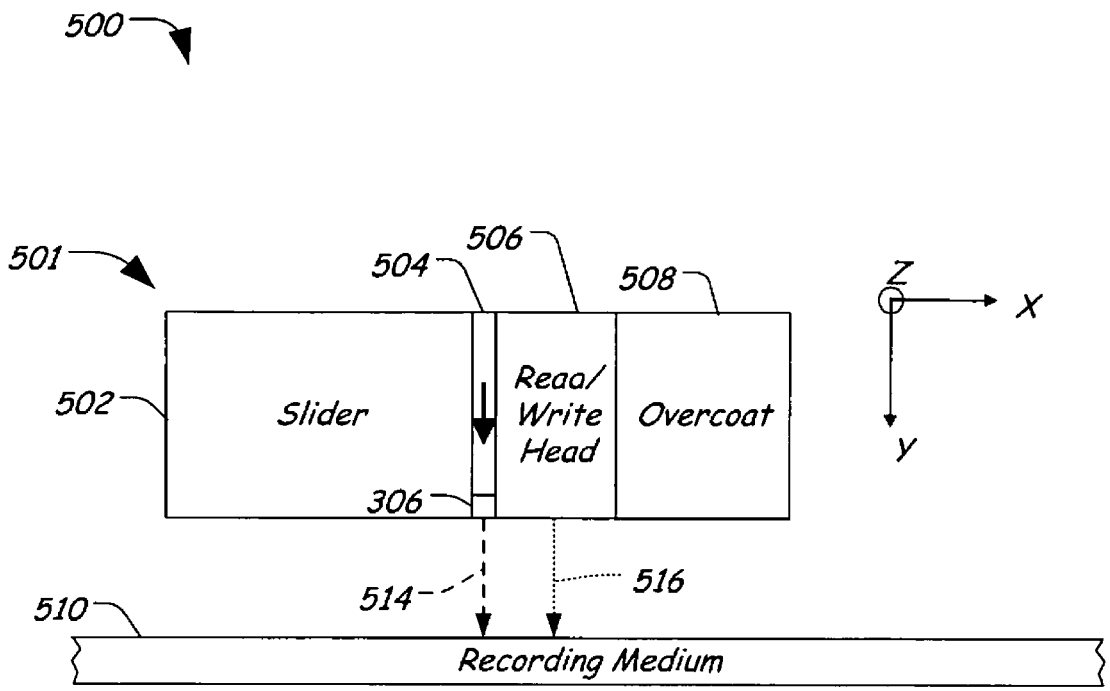
FIG. 5 is a block diagram of a particular illustrative embodiment of a recording head including a waveguide having a solid immersion lens, such as the waveguide illustrated in FIG. 3.

FIG. 5 is a block diagram of a particular illustrative embodiment of a system 500 including a recording head 501 having a waveguide 504 with a solid immersion lens 306, such as the waveguide 300 illustrated in FIG. 3. The system 500 includes a recording medium 510 located perpendicular to a Y-axis of the waveguide 504. The recording head 501 includes an air-bearing slider 502 that flies over the surface of the recording medium 510 and that is adapted to be adjusted in the X-direction and the Z-direction and that maintains a fly-height over the surface of the recording medium 510 in the Y-direction based on airflow. The air-bearing slider 502 is coupled to a read/write head 506, which is adjacent to the waveguide 504. The waveguide 504 includes a solid immersion mirror and a solid immersion lens 306 to focus evanescent waveform energy toward the surface of the recording medium 510. The recording head 501 further includes overcoat layer 508 protects the read/write head 506.

In a particular embodiment, the waveguide 504 directs focused energy 514 onto the surface of the recording medium 510 via the solid immersion lens 306 to heat a local area of the recording medium 510 to reduce a coercivity of the local area. Concurrently, the read/write head 506 directs a recording field 516 onto the recording medium 510 in the heated local area to record data to the recording medium.

Figure 6:
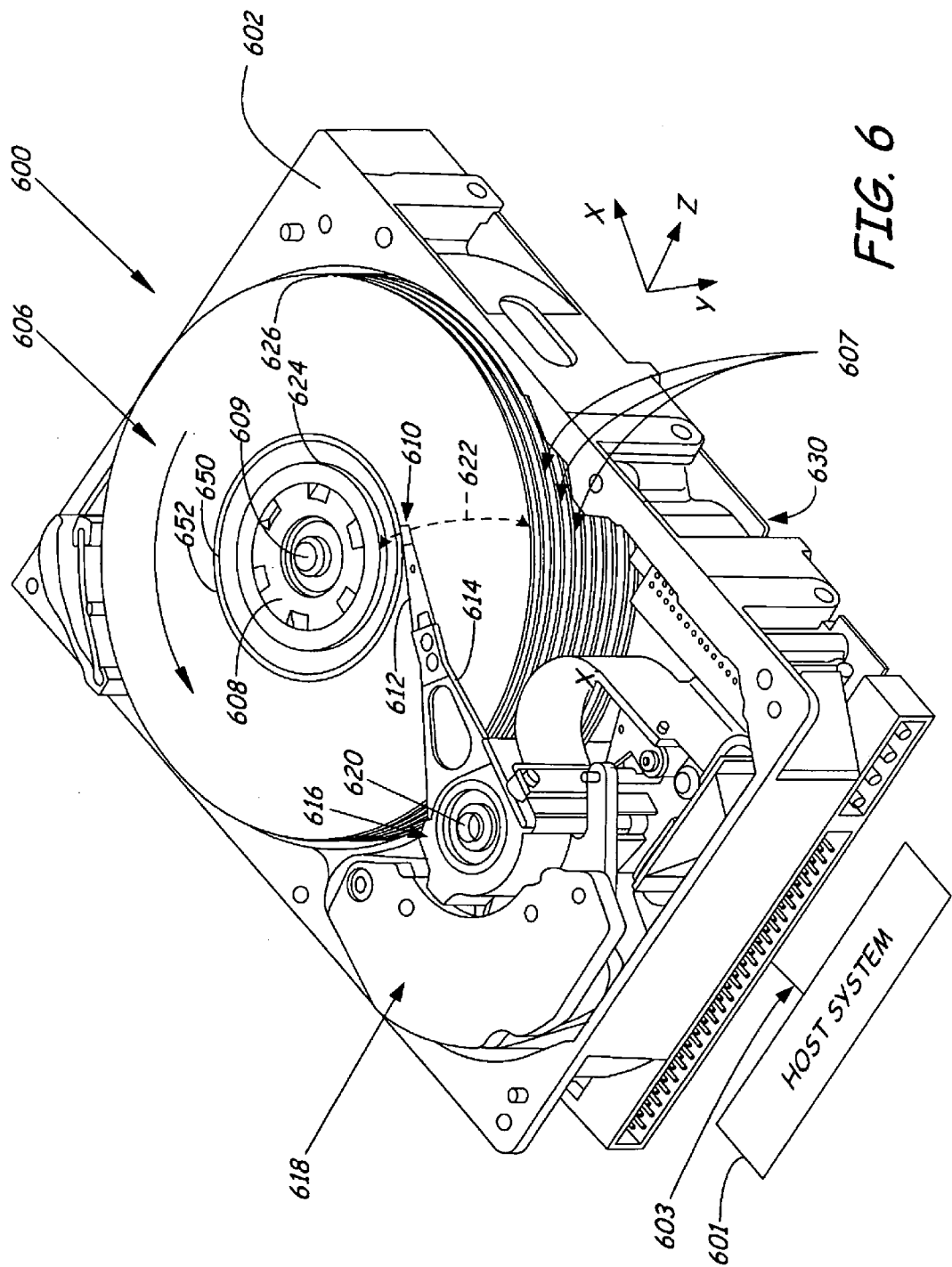
FIG. 6 is an isometric view of a system including a disc drive having a waveguide including a solid immersion lens for heat-assisted recording.

FIG. 6 is an isometric view of a disc drive 600 in which embodiments of the present invention are useful. Disc drive 600 includes a housing with a base 602 and a top cover (not shown). Disc drive 600 further includes a disc pack 606, which is mounted on a spindle motor (not shown) by a disc clamp 608. Disc pack 606 includes a plurality of individual discs, which are mounted for co-rotation about central axis 609. Each disc surface has an associated disc head slider 610 which is mounted to disc drive 600 for communication with the disc surface. In the example shown in FIG. 6, sliders 610 are supported by suspensions 612 which are in turn attached to track accessing arms 614 of an actuator 616. The actuator shown in FIG. 6 is of the type known as a rotary moving coil actuator and includes a voice coil motor (VCM), shown generally at 618. Voice coil motor 618 rotates actuator 616 with its attached heads 610 about a pivot shaft 620 to position heads 610 over a desired data track along an arcuate path 622 between a disc inner diameter 624 and a disc outer diameter 626. Voice coil motor 618 is driven by servo electronics 630 based on signals generated by heads 610 and a host computer (not shown).

In general, the disc head slider 610 supports a recording head that includes a waveguide with a meta-material solid immersion lens, such as the waveguide 300 and the solid immersion lens 306 illustrated in FIGS. 3 and 4. The solid immersion lens mounted to the disc head slider 610 includes a core sandwiched between meta-material slabs to direct focused energy onto a surface of a disc 607 of the disc pack 606 to provide heat-assisted recording. A control circuit included with the servo electronics 630 or co-located with the servo electronics 630 along a bottom portion of the disc drive 600 may be used to control a position of the slider 610 and the associated read/write head relative to one of the individual discs 607 of the disc pack 606.

Figure 7:
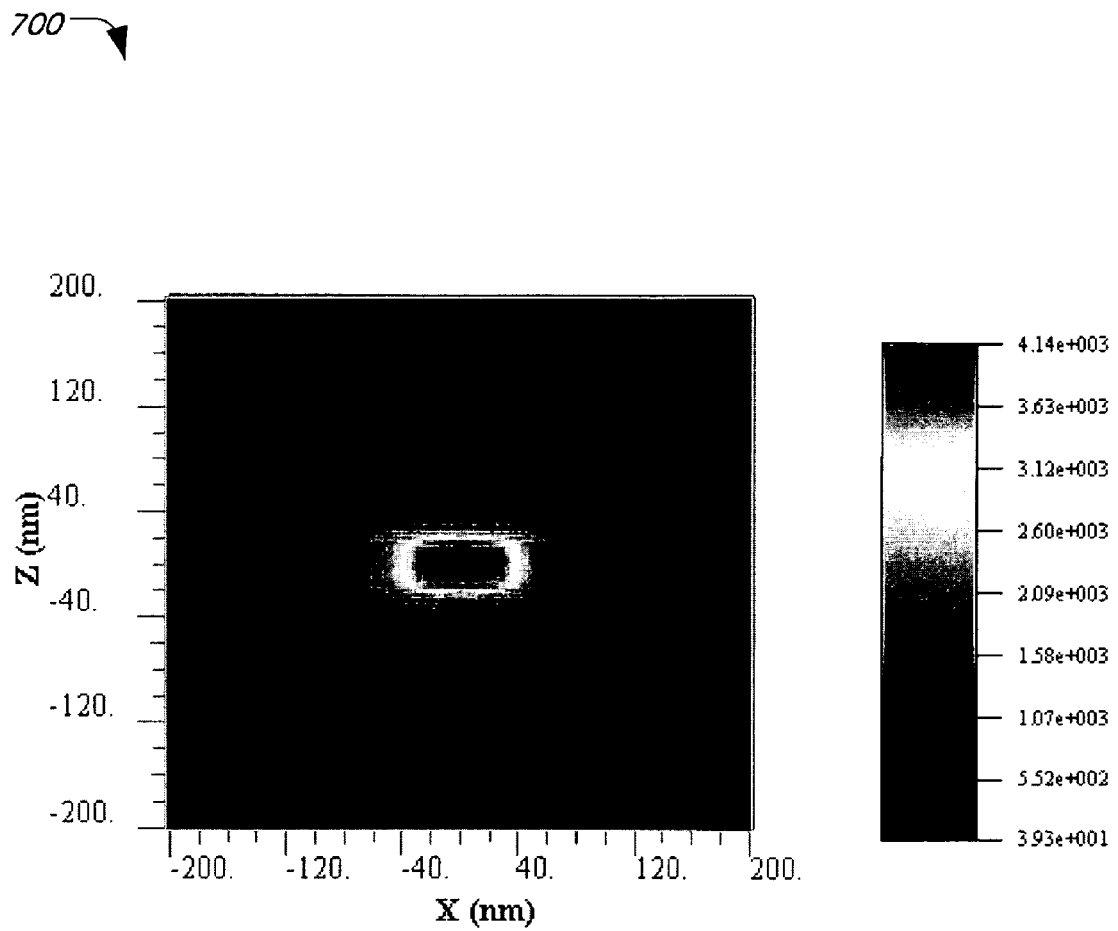
FIG. 7 is a particular illustrative embodiment of a graph of an electrical field strength ($E^2$) directed at a center of a plane of a magnetic layer via a waveguide including a solid immersion lens (SIL), where the SIL includes meta-material slabs formed from 15-nm thick layers of gold and 10-nm thick layers of $Ta_2O_5$ and includes a 40-nm $Al_2O_3$ core layer at a wavelength of 830-nm and where an optical power of the incident beam of 1 Watt.

FIG. 7 is a particular illustrative embodiment of a graph of an electrical field strength ($E^2$) directed at a center of a plane of a magnetic layer via a waveguide including a solid immersion lens (SIL), where the SIL includes meta-material slabs formed from 15-nm thick layers of gold and 10-nm thick layers of $Ta_2O_5$ and includes a 40-nm $Al_2O_3$ core layer at a wavelength of 830-nm and where an optical power of the incident beam of 1 Watt. To demonstrate the focusing effect of the meta-material SIL, such as the SIL 306 illustrated in FIG. 3, a medium was placed underneath a focal area of the meta-material SIL and the SIL was used to direct an incident beam onto the medium. The medium consisted of a silicon substrate with an eight (8)-nm thick diamond-like-carbon (DLC) layer having refractive index of 1.211 (i.e., n=1.211), a 12.6-nm thick FePtCuC magnetic layer having a refractive index of 3.068+i1.523 (i.e., n=3.068+i1.523), and a 20-nm thick MgO layer (n=1.7). The cladding layers of the waveguide were alumina ($Al_2O_3$) with a refractive index of 1.65 (i.e., n=1.65) and a first core of tantala ($Ta_2O_5$) with a refractive index of 2.15 (i.e., n=2.15). The radius of the SIL was fixed at 160-nm.

At a wavelength ($\lambda$) of 830-nm, the thickness of the core of the waveguide was chosen to be 160-nm, which yields a confined transverse magnetic (TM) mode. The anisotropic meta-material of the meta-material slabs included alternating layers of 15-nm thick gold (Au) and 10-nm thick Tantala ($Ta_2O_5$). In this particular example, the layers of the meta-material slabs nearest to the core of the solid immersion lens were formed from gold. The core of the solid immersion lens was formed of 40-nm thick $Al_2O_3$.

In general, the graph 700 illustrates the electrical field strength ($E^2$). The graph 700 shows that the light is well confined to a bright spot and the full-width-at-half-maximum (FWHM) spot size is 114-nm along the X-direction and 60-nm along the Z-direction. In this instance, the total absorption of the magnetic layer is approximately 0.255. Without the meta-material solid immersion lens, the light is confined to a spot of approximately 149-nm in the X-direction and approximately 350-nm in the Z-direction with a maximum electrical field strength of approximately 1150 (i.e., max ($E^2$)=1.15×10³) and the total absorption in the magnetic layer was only 0.225. Thus, the meta-material solid immersion lens condenses the light by a factor of 7.6 with a peak intensity enhanced by a factor of 3.6.

Figure 8:
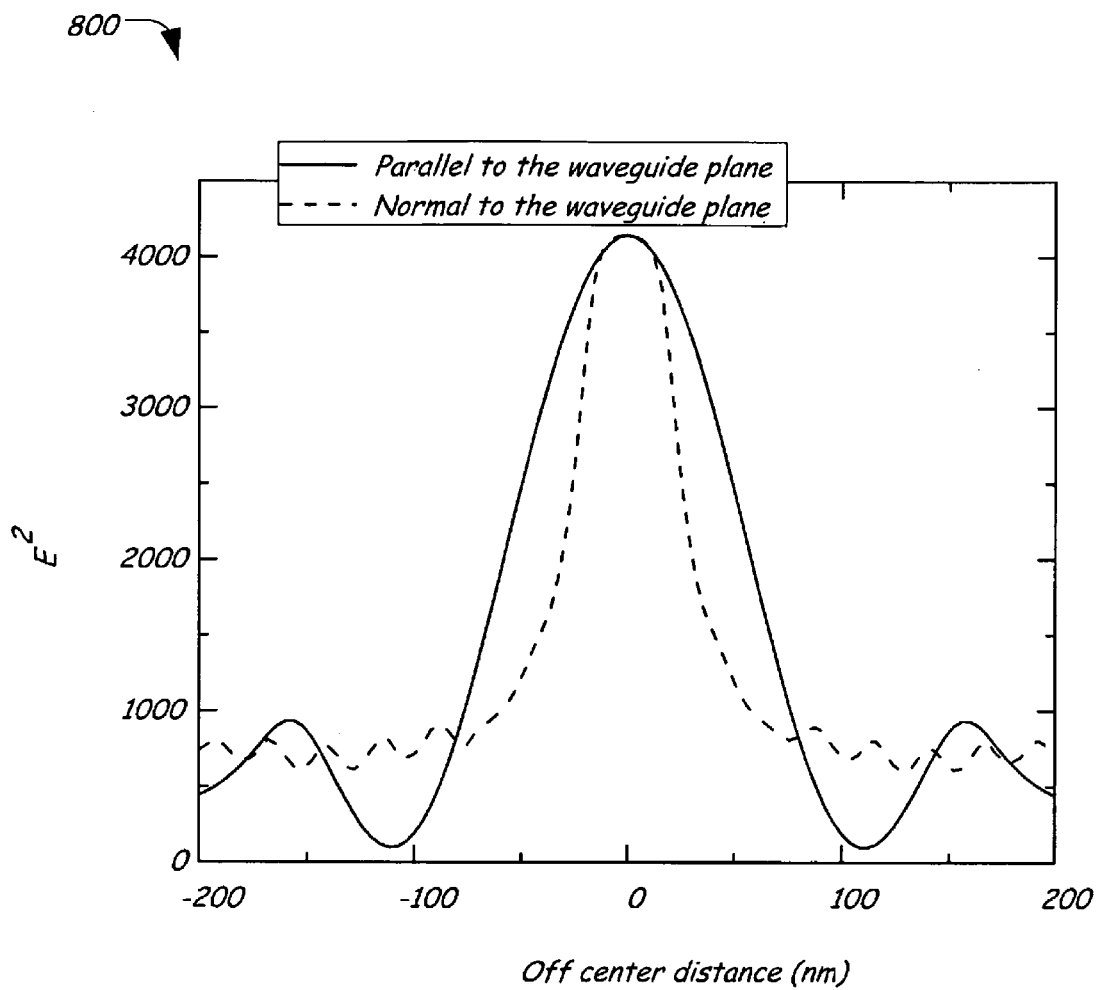
FIG. 8 is a plot of the electrical field versus off-center distance in nanometers along an X-direction parallel to a waveguide plane and along a Z-direction normal to the waveguide plane for the electrical field illustrated in FIG. 7.

FIG. 8 is a plot 800 of the electrical field versus off-center distance in nanometers along an X-direction parallel to a waveguide plane and along a Z-direction normal to the waveguide plane for the electrical field illustrated in FIG. 7. In general, the peak energy of the beam in the X-direction is well confined to an area within 100-nm of the center, and the peak energy of the beam in the Z-direction is well confined to an area with 50-nm of the center.

Figure 9:
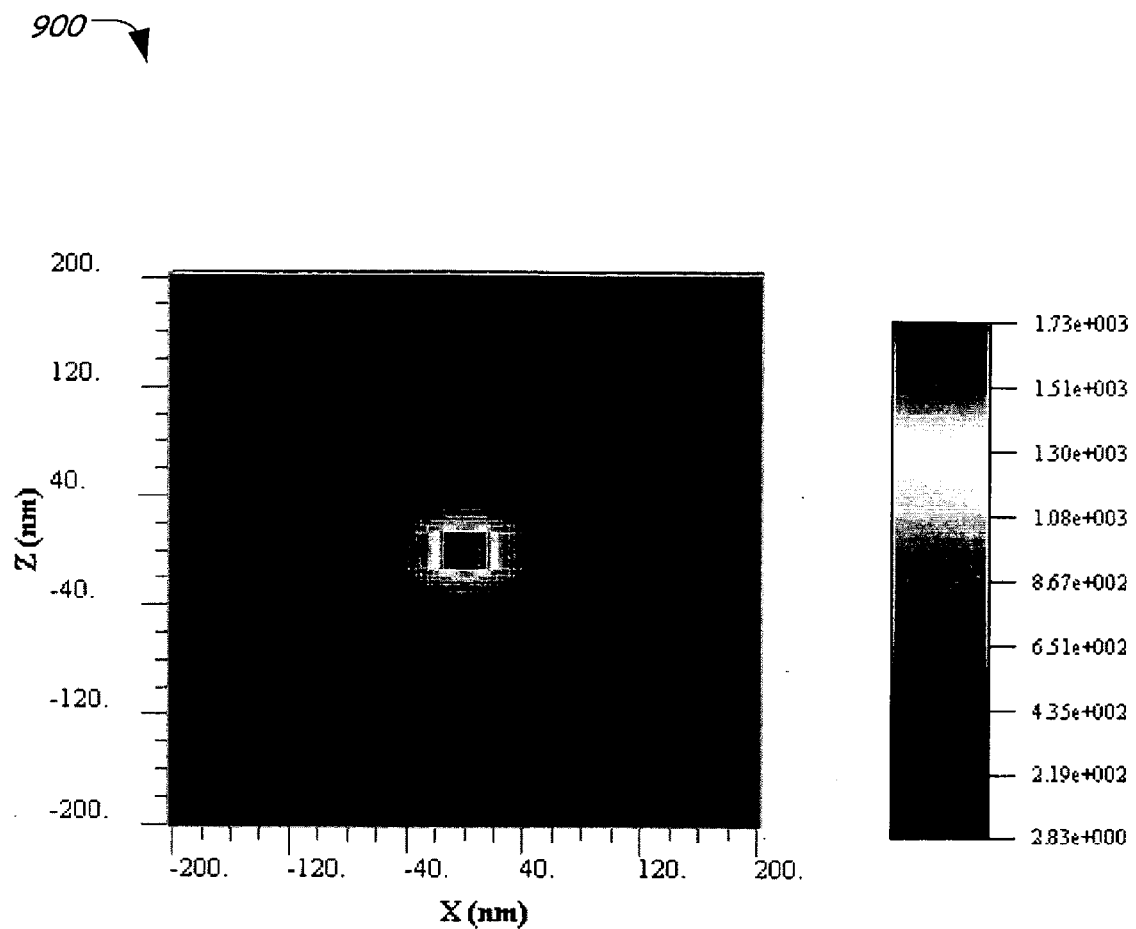
FIG. 9 is a particular illustrative embodiment of a graph of an electrical field strength ($E^2$) directed at a center of a plane of a magnetic layer via a waveguide including a solid immersion lens (SIL), where the SIL includes meta-material slabs formed from 15-nm thick layers of Aluminum and 10-nm thick layers of $Al_2O_3$ and includes a 30-nm core layer of $SiO_2$ at a wavelength of 400-nm and where an optical power of the incident beam of 1 Watt.

FIG. 9 is a particular illustrative embodiment of a graph 900 of an electrical field strength ($E^2$) directed at a center of a plane of a magnetic layer via a waveguide including a solid immersion lens (SIL), where the SIL includes meta-material slabs formed from 15-nm thick layers of Aluminum and 10-nm thick layers of $Al_2O_3$ and includes a 30-nm core layer of $SiO_2$ at a wavelength of 400-nm and where an optical power of the incident beam of 1 Watt. In general, one technique for achieving a better-defined spot is to use a shorter wavelength (i.e., 400-nm instead of 830-nm).

In this example, the effective refractive index of this meta-material was $n=\sqrt{\in_z}=2.86+i\ 0.00586$. The core had a refractive index of n=1.46. The thickness of the core of the waveguide was 100-nm. The refractive index used in the calculation for Al was n=0.49+i 4.86. For the magnetic layer (composed of FePtCuC), the refractive index used in the calculation was n=2.082+i 1.528.

In this example, light is again confined to a spot with a full-width-at-half-maximum (FWHM) of 64-nm (X-direction) by 51-nm (Z-direction). A total absorption in the magnetic layer was 0.19 and the absorption within 50-nm square is 0.025. Without the meta-material SIL, the solid immersion mirror focused spot was approximately 88-nm by 162-nm and the total absorption in the magnetic layer was 0.27. Thus, the meta-material SIL enhanced the peak $E^2$ by a factor of 1.7.

Figure 10:
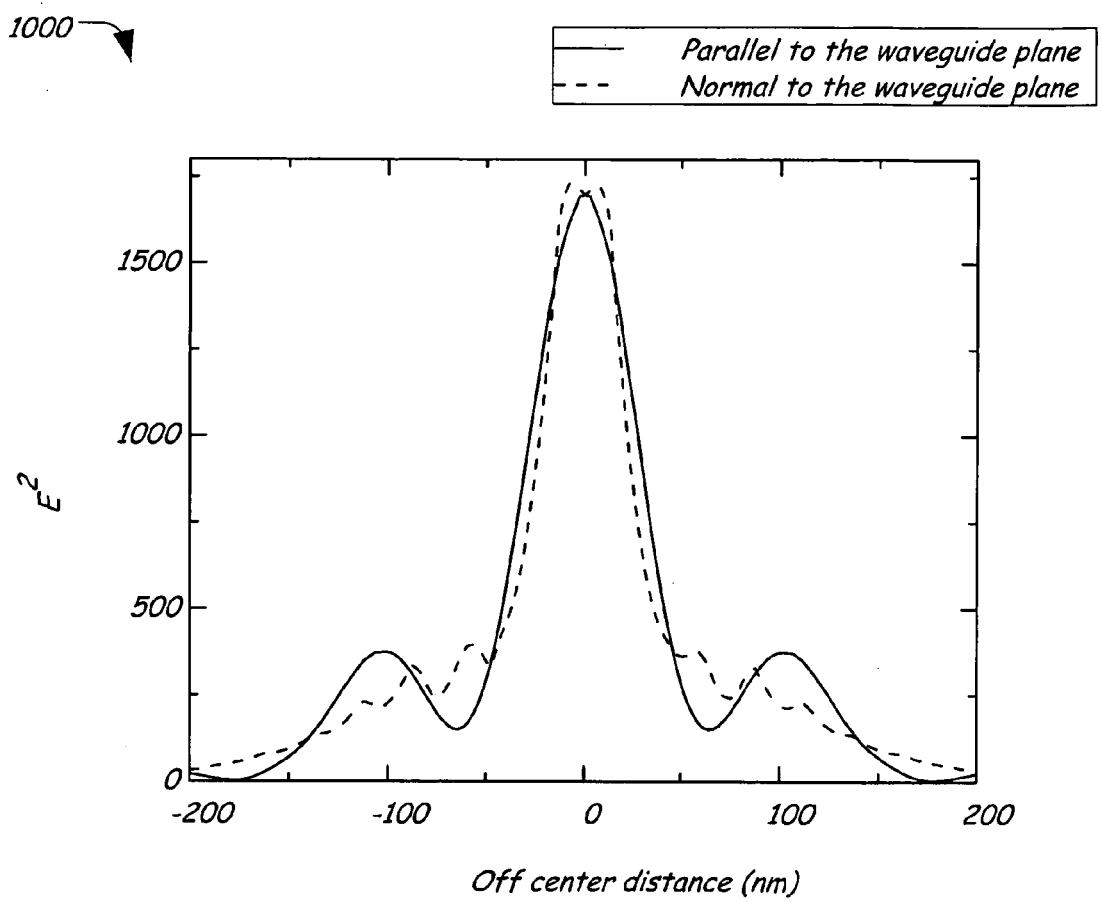
FIG. 10 is a plot of the electrical field versus off-center distance in nanometers along an X-direction parallel to a waveguide plane and along a Z-direction normal to the waveguide plane for the electrical field illustrated in FIG. 9.

FIG. 10 is a plot 1000 of the electrical field versus off-center distance in nanometers along an x-direction parallel to a waveguide plane and along a z-direction normal to the waveguide plane for the electrical field illustrated in FIG. 9. As shown, the peak energy of the beams in the X-direction and in the Z-direction are well-confined to an area within 50-nm of the center.

Figure 11:
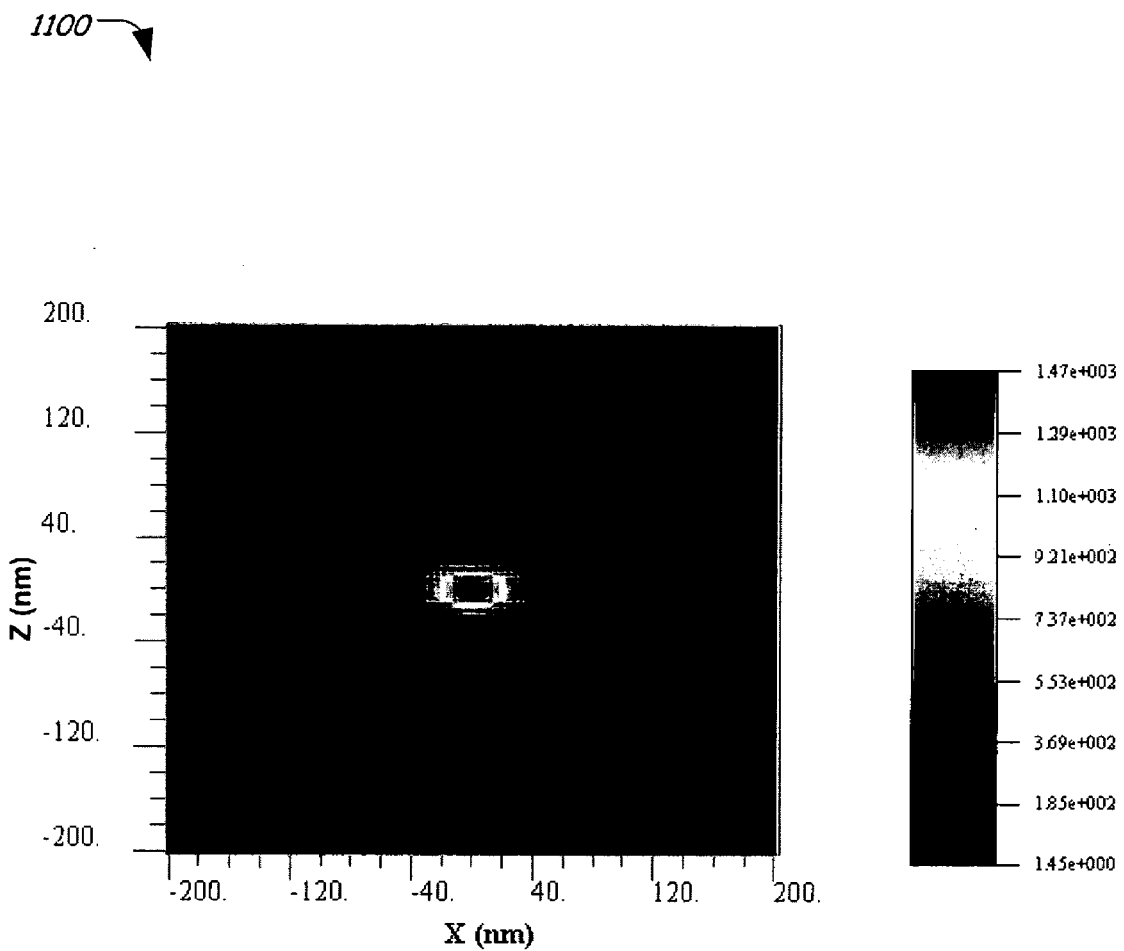
FIG. 11 is a particular illustrative embodiment of a graph of an electrical field strength ($E^2$) directed at a center of a plane of a magnetic layer via a waveguide including a solid immersion lens (SIL), where the SIL includes meta-material slabs formed from 15-nm thick layers of Aluminum and 10-nm thick layers of $Al_2O_3$ and includes a 20-nm core layer of $SiO_2$ at a wavelength of 400-nm and where an optical power of the incident beam of 1 Watt.

FIG. 11 is a particular illustrative embodiment of a graph 1100 of an electrical field strength ($E^2$) directed at a center of a plane of a magnetic layer via a waveguide including a solid immersion lens (SIL), where the SIL includes meta-material slabs formed from 15-nm thick layers of Aluminum and 10-nm thick layers of $Al_2O_3$ and includes a 20-nm core layer of $SiO_2$ at a wavelength of 400-nm and where an optical power of the incident beam of 1 Watt.

In this example, the effective refractive index of this meta-material was $n=\sqrt{\in_z}=2.86+i\ 0.00586$. The core had a refractive index of n=1.46. The thickness of the core of the waveguide was 100-nm. The refractive index used in the calculation for Al was n=0.49+i 4.86 and for FePtCuC magnetic layer n=2.082+i 1.528.

In this example, light is again confined to a spot with a full-width-at-half-maximum (FWHM) of 60-nm (X-direction) by 37-nm (Z-direction). The absorption within 50-nm square was 0.021. Thus, the thickness of the core layer of the meta-material solid immersion lens can be used to adjust a size of the spot and to adjust the absorption.

Figure 12:
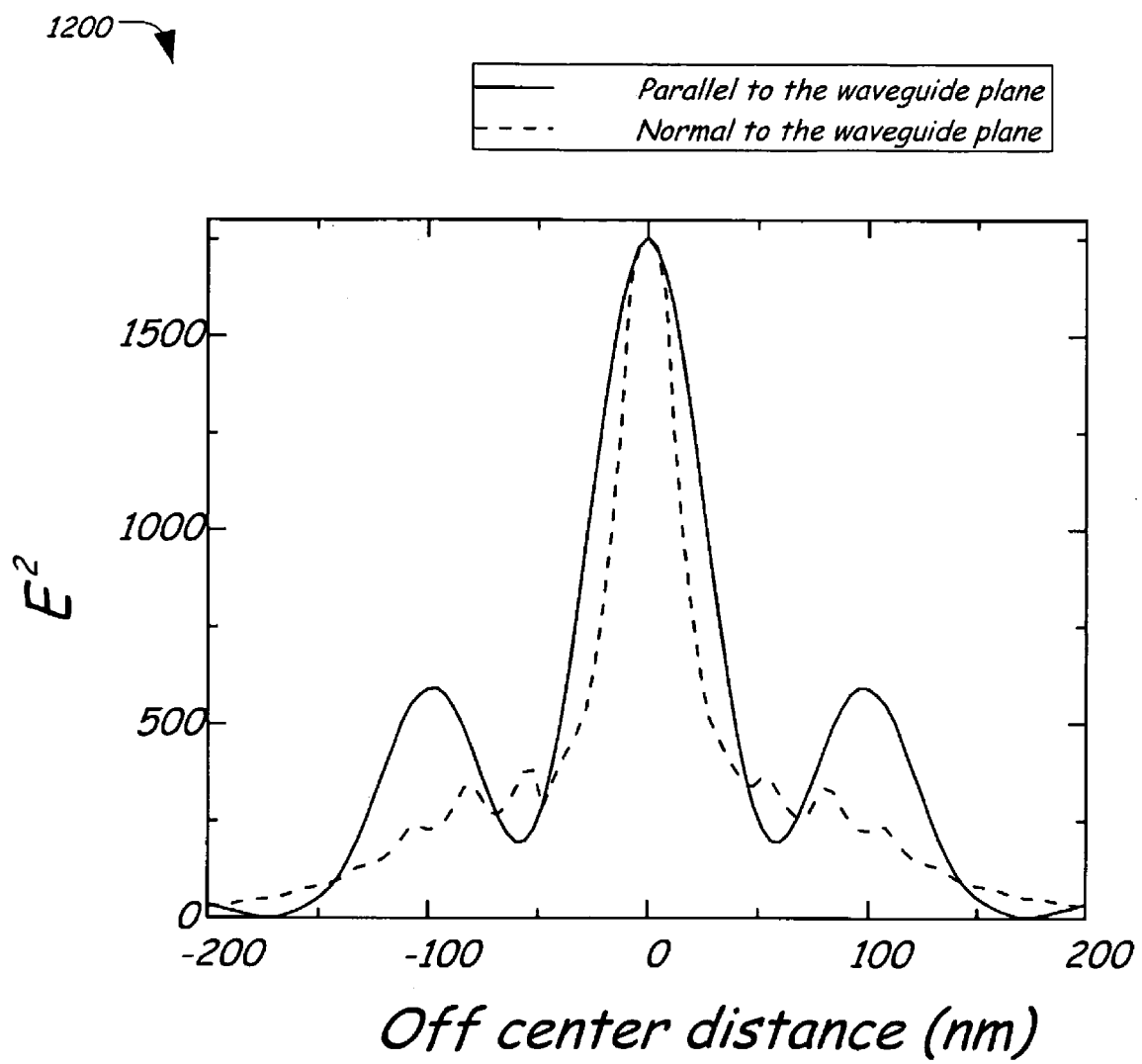
FIG. 12 is a plot of the electrical field versus off-center distance in nanometers along an X-direction parallel to a waveguide plane and along a Z-direction normal to the waveguide plane for the electrical field illustrated in FIG. 11.

FIG. 12 is a plot of the electrical field versus off-center distance in nanometers along an x-direction parallel to a waveguide plane and along a z-direction normal to the waveguide plane for the electrical field illustrated in FIG. 11. As shown, the energy of the beams in the X-direction and in the Z-direction is well-confined to an area of less than 50-nm of the center.

Figure 13:
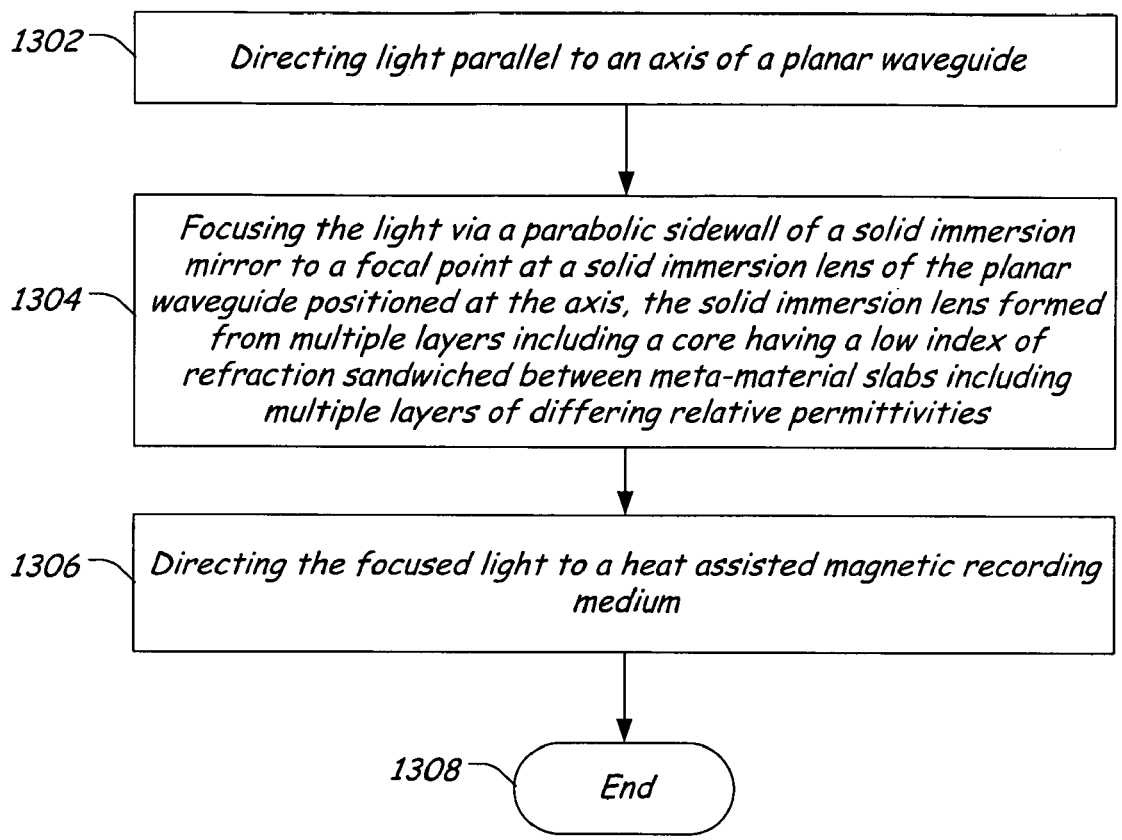
FIG. 13 is a flow diagram of a particular illustrative embodiment of a method of directing an electrical field at a focused area via a solid immersion lens.

FIG. 13 is a flow diagram of a particular illustrative embodiment of a method of directing an electrical field at a focused area via a solid immersion lens. At 1302, light is directed parallel to an axis of a planar waveguide. In a particular embodiment, the light represents an evanescent waveform related to light incident to the planar waveguide. Continuing to 1304, the light is focused via a parabolic sidewall of a solid immersion mirror to a focal point at a solid immersion lens of the planar waveguide positioned at the axis, where the solid immersion lens is formed from multiple layers including a core having a low index of refraction sandwiched between meta-material slabs including multiple layers of differing relative permittivities. In a particular example, the solid immersion lens and the solid immersion mirror are formed from the waveguide. The waveguide includes a first core material sandwiched between cladding layers. In a particular example, the meta-material slabs are formed from periodic layers of differing materials having different thicknesses and different permittivities. In a particular example, the multiple layers of the meta-material slabs may have different material compositions, different thicknesses, different permittivities, different indexes of refraction, different relative dielectric constants, or any combination thereof.

Proceeding to 1306, the focused light is directed to a heat-assisted recording medium via the solid immersion lens. In a particular embodiment, the meta-material slabs compress a waveform along an axis parallel to the core, exciting surface plasmons associated with the core, which directs energy associated with the excited surface plasmons toward the recording medium. In a particular example, an optical recording means or a magnetic recording means may be positioned adjacent to the waveguide to write data to the recording medium at heated locations. The method terminates at 1308.

Figure 14:
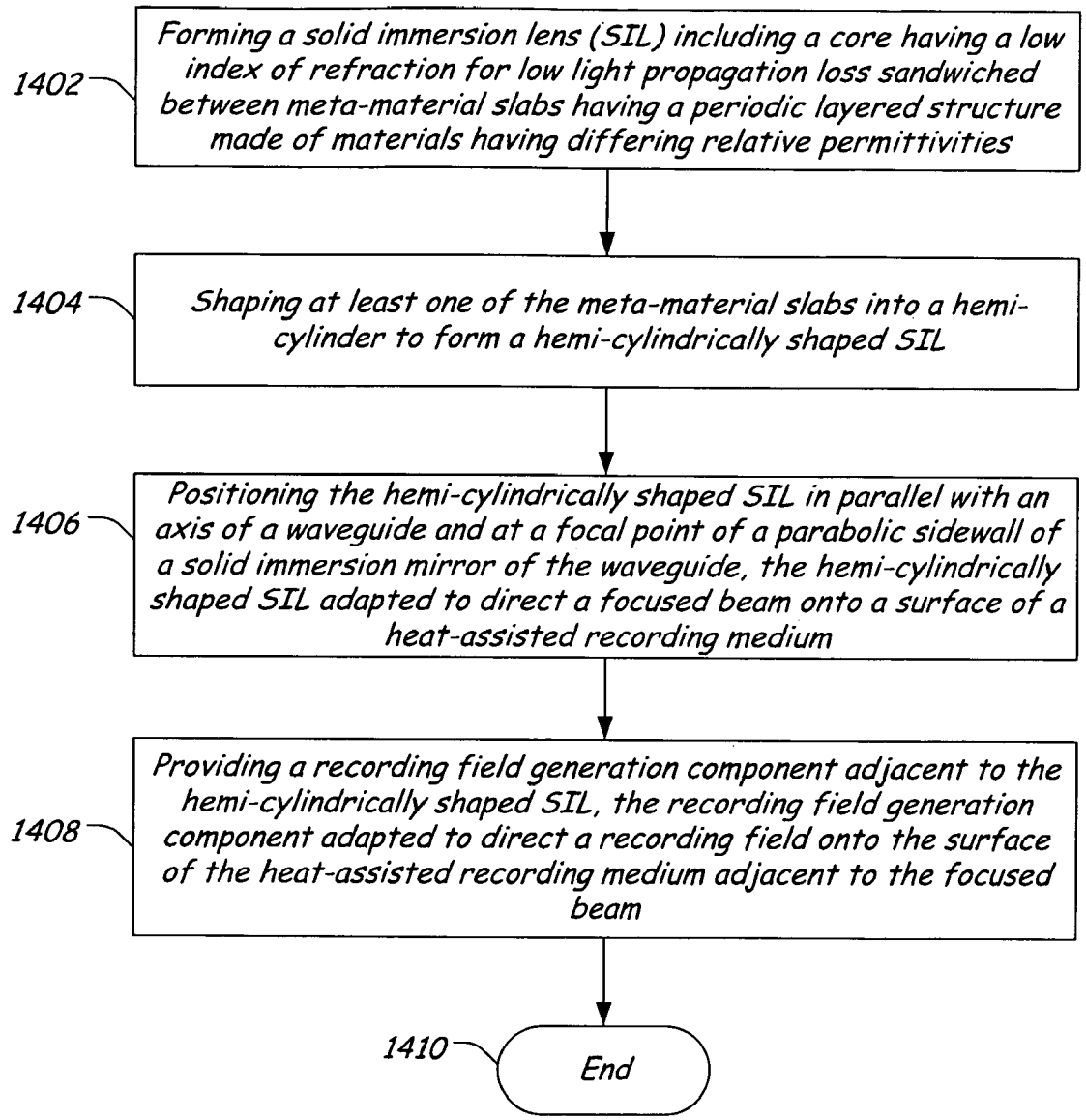
FIG. 14 is a flow diagram of a particular illustrative embodiment of a method of forming a recording device including a waveguide having a solid immersion lens formed of a core sandwiched between meta-material slabs.

FIG. 14 is a flow diagram of a particular illustrative embodiment of a method of forming a recording device including a waveguide having a solid immersion lens formed of a core sandwiched between meta-material slabs. At 1402, a solid immersion lens (SIL) is formed that includes a core having a low index of refraction for low light propagation loss sandwiched between meta-material slabs having a period layered structure made of materials having differing relative permittivities. In a particular example, the meta-material slabs may be formed from layers of different compositions having different layer thicknesses.

Advancing to 1404, at least one of the meta-material slabs is shaped into a hemi-cylinder to form a hemi-cylindrically shaped solid immersion lens. Continuing to 1406, the hemi-cylindrically shaped solid immersion lens is positioned in parallel with an axis of a waveguide and at a focal point of a parabolic sidewall of a solid immersion mirror of the waveguide, where the hemi-cylindrically shaped solid immersion lens is adapted to direct a focused beam onto a surface of a heat-assisted recording medium. Proceeding to 1408, a recording field generation component is provided adjacent to the hemi-cylindrically shaped solid immersion lens, where the recording field generation component is adapted to direct a recording field onto the surface of the heat-assisted recording medium adjacent to the focused beam. The method terminates at 1410.

In a particular example, the energy focused by the solid immersion lens can be partially controlled by fabrication geometries, including the geometries of the meta-material slabs that sandwich the core of the solid immersion lens. In conjunction with the above-disclosure, it should be understood that materials of high index of refraction can be synthesized by controlling geometric factors of the meta-material slabs, such as layer thicknesses and composition. Further, by controlling a composition of the layers of the meta-material slabs and the thicknesses of the layers of the meta-material slabs, by controlling a length of the core, and by selecting the material layers based on permittivities, indexes of refraction, dielectric constants, or any combination thereof, a solid immersion lens can be reliably produced that can be used to record data to a recording medium in a heat-assisted recording application.

It is to be understood that even though numerous characteristics and advantages of various embodiments have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application for the solid immersion lens while maintaining substantially the same functionality without departing from the scope and spirit of the present invention. In addition, although an embodiment described herein is directed to a solid immersion lens for use in connection with a magnetic or optical recording head to facilitate heat-assisted recording, it will be appreciated by those skilled in the art that the teachings of the present invention can be applied to other focused heating applications, without departing from the scope and spirit of the present invention.

Although the present invention has been described with reference to preferred embodiments, workers skilled in the art will recognize that changes may be made in form and detail without departing from the spirit and scope of the invention.

What is claimed is:

1. A solid immersion lens comprising:
   meta-material slabs formed from multiple layers of at least two different compositions, each meta-material slab having a first effective index of refraction, the meta-material slabs to propagate an evanescent wave in a direction parallel to an axis to form a cone-shaped wave along the axis; and
   a core sandwiched between the meta-material slabs along the axis and having a second index of refraction that is less than the first effective index of refraction, the core to direct surface plasmons that are excited by the cone-shaped wave to a focused area coincident with the axis.

2. The solid immersion lens of claim 1, wherein the first effective index of refraction is determined by geometries of the multiple layers.

3. The solid immersion lens of claim 2, wherein the multiple layers have different thicknesses.

4. The solid immersion lens of claim 3, wherein a thickness of each layer of the multiple layers is less than a wavelength of an incident light source.

5. The solid immersion lens of claim 1, wherein the at least two different compositions have different relative permittivities.

6. The solid immersion lens of claim 1, wherein the at least two different compositions comprise periodic layers of a first material and a second material, the first material comprising a noble metal having a first thickness and a first permittivity tensor that is below a plasmon frequency associated with the core, the second material comprising a dielectric material having a second permittivity tensor that is greater than the first permittivity tensor.

7. The solid immersion lens of claim 1, wherein at least one of the meta-material slabs comprises a hemi-cylindrical shape to focus energy associated with the surface plasmons to the focused area.

8. A recording head comprising:
a solid immersion lens comprising:
at least two meta-material slabs having first effective permittivities, each of the at least two meta-material slabs comprising multiple layers of at least two materials having different relative permittivities; and
a core sandwiched between the at least two meta-material slabs and having a second permittivity that is less than the first effective permittivities.

9. The recording head of claim 8, wherein each of the at least two meta-material slabs comprises alternating layers of a first material and a second material.

10. The recording head of claim 9, wherein the first material and the second material have different thicknesses.

11. The recording head of claim 10, wherein each of the different thicknesses are less than a wavelength of light incident on the solid immersion lens.

12. The recording head of claim 9, wherein the first material comprises a noble metal and having a permittivity tensor below a plasmon frequency of the core and the second material comprises a dielectric material having a second permittivity tensor that is greater than the first permittivity tensor.

13. The recording head of claim 9, wherein the first material is selected from a group consisting of aluminum, gold, silver, and copper.

14. The recording head of claim 8, wherein the first effective permittivity is proportionally related to thicknesses of the multiple layers.

15. The recording head of claim 8, wherein at least one of the at least two meta-material slabs is configured to have a hemi-cylindrical shape.

16. A solid immersion lens comprising:
at least two meta-material slabs having first effective permittivities and comprising alternating layers of at least two different materials having different thicknesses and different relative permittivities; and
a core sandwiched between the at least two meta-material slabs and having a second permittivity that is less than the first effective permittivities.

17. The solid immersion lens of claim 16, wherein the at least-two meta-material slabs direct at least one component of a wave vector associated with an incident wave to form a cone around an axis associated with the core.

18. The solid immersion lens of claim 16, wherein the at least two meta-material slabs compress the at least one component of the wave vector to a focused spot coincident with an axis associated with the core.

19. The solid immersion lens of claim 16, wherein the core has a low index of refraction for low light propagation loss relative to the at least two meta-material slabs.

20. The solid immersion lens of claim 16, wherein the at least two different materials comprise a first material including a noble metal having a first permittivity tensor below a plasmon frequency of the core and a second material formed from a dielectric material having a second permittivity tensor that is greater than the first permittivity tensor.

21. The solid immersion lens of claim 20, wherein an evanescent wave with a large wave vector propagates with a real value through the at least two meta-material slabs along an axis parallel to a core axis associated with the core, where the real value correspond to a component of the large wave vector that is parallel to the core axis, wherein the component of the large wave vector excites plasmons along a surface of the core to form a cone around the core axis.

* * * * *